United States Patent
Vijayasankar et al.

(10) Patent No.: US 11,844,038 B2
(45) Date of Patent: Dec. 12, 2023

(54) SYNCHRONIZATION OF WIRELESS NETWORK NODES FOR EFFICIENT COMMUNICATIONS

(71) Applicant: TEXAS INSTRUMENTS INCORPORATED, Dallas, TX (US)

(72) Inventors: Kumaran Vijayasankar, Allen, TX (US); Wonsoo Kim, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 60 days.

(21) Appl. No.: 17/473,609

(22) Filed: Sep. 13, 2021

(65) Prior Publication Data

US 2022/0086783 A1    Mar. 17, 2022

Related U.S. Application Data

(60) Provisional application No. 63/078,659, filed on Sep. 15, 2020.

(51) Int. Cl.
*H04W 56/00* (2009.01)

(52) U.S. Cl.
CPC ... *H04W 56/0015* (2013.01); *H04W 56/0005* (2013.01)

(58) Field of Classification Search
CPC ......... H04W 56/0015; H04W 56/0005; H04W 56/0035
See application file for complete search history.

(56) References Cited

U.S. PATENT DOCUMENTS

| | | | | |
|---|---|---|---|---|
| 9,673,970 | B1* | 6/2017 | Aweya | H04W 56/0035 |
| 2011/0216660 | A1* | 9/2011 | Lee | H04W 56/0015 |
| | | | | 370/252 |
| 2012/0263220 | A1* | 10/2012 | Li | H04W 56/00 |
| | | | | 375/354 |
| 2018/0062698 | A1* | 3/2018 | Wang | H04B 1/713 |
| 2019/0059066 | A1 | 2/2019 | Harmatos et al. | |
| 2021/0068092 | A1* | 3/2021 | Abedini | H04W 56/0075 |
| 2023/0060890 | A1* | 3/2023 | Agahi | H04B 1/7143 |

FOREIGN PATENT DOCUMENTS

| | | |
|---|---|---|
| CN | 110891307 A | 3/2020 |
| WO | 2007/111480 A1 | 10/2007 |

OTHER PUBLICATIONS

PCT International Search Report; PCT/US 2021/050166; dated Nov. 11, 2021; 2pages.

(Continued)

*Primary Examiner* — Ricardo H Castaneyra
(74) *Attorney, Agent, or Firm* — Mandy Barsilai Fernandez; Frank D. Cimino

(57) ABSTRACT

In examples, an electronic device comprises a transceiver and a processor coupled to the transceiver. The processor is configured to synchronize a clock of the electronic device to a clock of another electronic device using elapsed time indications in multiple packets received from the another electronic device via the transceiver. The processor is configured to transmit a packet via the transceiver using the synchronized clock of the electronic device.

22 Claims, 6 Drawing Sheets

(56) References Cited

OTHER PUBLICATIONS

Field Area Network Working Group (FANWG), Technical Profile Specification Field Area Network, Version 1v00, 20130125-FANWG-FANTPS-1v00, 128 pgs., 2016.

"IEEE Standard for Local and metropolitan area networks—Part 15.4: Low-Rate Wireless Personal Area Networks (LR-WPANs) Amendment 1: MAC sublayer," in IEEE Std 802.15.4e-2012 (Amendment to IEEE Std 802.15.4-2011), vol., No., pp. 1-225, Apr. 16, 2012, doi: 10.1109/IEEESTD.2012.6185525.

"IEEE Standard for Local and metropolitan area networks—Part 15.4: Low-Rate Wireless Personal Area Networks (LR-WPANs)," in IEEE Std 802.15.4-2011 (Revision of IEEE Std 802.15.4-2006), vol., No., pp. 1-314, Sep. 5, 2011, doi: 10.1109/IEEESTD.2011.6012487.

\* cited by examiner

| NODE ID (702) | TIME ELAPSED (704) | HOPPING SEQUENCE (706) | MISCELLANEOUS INFORMATION (708) |
|---|---|---|---|
| ~~~ | ~~~ | ~~~ | ~~~ |
| ~~~ | ~~~ | ~~~ | ~~~ |
| ~~~ | ~~~ | ~~~ | ~~~ |
| ~~~ | ~~~ | ~~~ | ~~~ |

SYNCHRONIZATION OF WIRELESS NETWORK NODES FOR EFFICIENT COMMUNICATIONS

CROSS-REFERENCE TO RELATED APPLICATIONS

The present application claims priority to U.S. Provisional Patent Application No. 63/078,659, which was filed Sep. 15, 2020, is titled "Low-Power Un-Slotted Channel Hopping (USCH) Synchronization Scheme," and is hereby incorporated herein by reference in its entirety.

BACKGROUND

Wireless networks frequently implement channel hopping schemes in which network nodes switch between different channels of a frequency band to transmit and receive data. Unicast communications between a pair of network nodes entails a receiver node hopping channels according to a specified (e.g., pseudo-random) pattern and a transmitter node transmitting packets to the receiver node by first determining the channel on which the receiver node is operating at a given point in time.

For a transmitter node to determine the channel on which the receiver node is operating, the transmitter node assumes clock synchronicity between the transmitter and receiver nodes. Transmitter and receiver nodes may achieve clock synchronicity using transmitter node timing information that is included in packets transmitted to the receiver node, thereby mitigating naturally occurring clock drift. The receiver node may store such transmitter node timing information for future reference, such as when the receiver node later transmits packets to the transmitter node.

Assuming clock synchronicity, a transmitter node may determine the channel on which the receiver node is operating by determining a time elapsed since a prior reference point in time and dividing the elapsed time by the time duration of each channel slot, also known as the dwelling time. The quotient of this division operation indicates the number of channel hops that have occurred since the reference point in time, and, combined with the hopping sequence of the receiver node, is useful to determine the specific channel on which the receiver node is operating. The transmitter node may then transmit a packet to the receiver node on that channel.

SUMMARY

In examples, an electronic device comprises a transceiver and a processor coupled to the transceiver. The processor is configured to synchronize a clock of the electronic device to a clock of another electronic device using elapsed time indications in multiple packets received from the another electronic device via the transceiver. The processor is configured to transmit a packet via the transceiver using the synchronized clock of the electronic device.

BRIEF DESCRIPTION OF THE DRAWINGS

For a detailed description of various examples, reference will now be made to the accompanying drawings in which.

DETAILED DESCRIPTION

Figure 1:
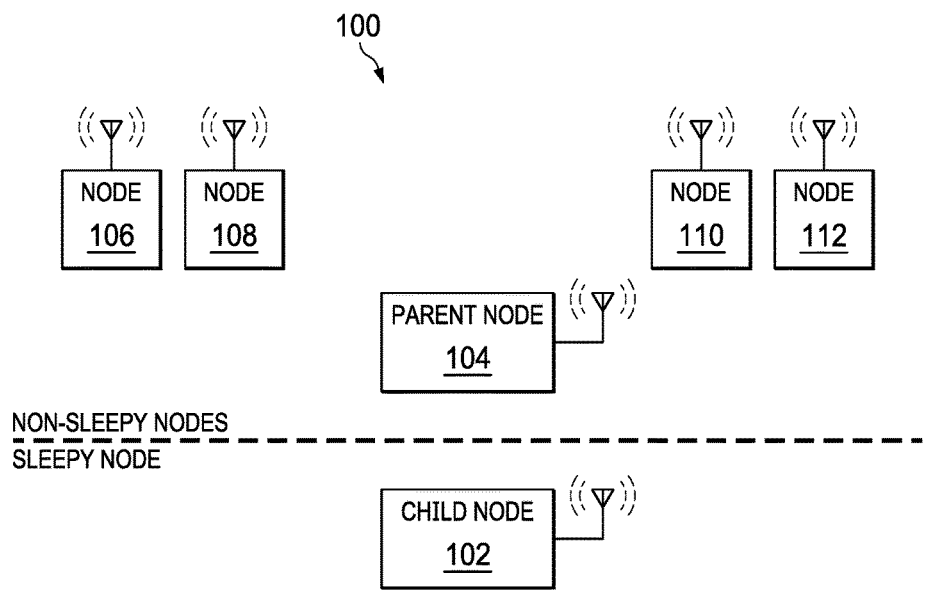
FIG. 1 is a block diagram of a wireless network having sleepy and non-sleepy nodes, in accordance with various examples.

As described above, in the unicast communication context, clock synchronicity is required for channel hopping wireless network nodes to communicate with each other. Without regular clock synchronization, clock drift prevents network nodes from accurately determining the channels on which other network nodes are operating, which, in turn, prevents the nodes from communicating with each other.

To mitigate clock drift, a transmitter node may repeatedly transmit a heartbeat packet to a receiver node. The heartbeat packet includes timing information associated with the transmitter node, and the receiver node may capture, store, and use this timing information to subsequently communicate with the transmitter node. In some applications, network nodes may be battery-powered, such as in flow meters or mobile personal electronics. Repeatedly transmitting heartbeat packets is energy inefficient, and this inefficiency is particularly problematic for battery-powered network nodes. Without the regular transmission of heartbeat packets, however, a battery-powered network node experiences clock drift and becomes clock-asynchronous relative to other nodes in the network, thus precluding the battery-powered network node from communicating with the other nodes in the network. In addition, due to the above-described inefficiencies associated with heartbeat packet transmission, it is useful to reduce the number of transmissions to reduce power consumption.

This disclosure describes various techniques whereby a battery-powered network node may synchronize clocks with other network nodes without the transmission of heartbeat packets. More specifically, a battery-powered network node (hereinafter, a child node) may receive a first packet from another network node (hereinafter, a parent node). The child node may subsequently receive a second packet from the parent node. The child node may calculate the time elapsed between the first and second packets as registered by the parent node based on the timing information embedded in the first and second packets. The child node may adjust its time elapsed between the first and second packets to match that of the parent node, thereby achieving clock synchronicity between the two nodes without the transmission of energy-inefficient heartbeat packets by the child node. Because the clocks are synchronized, each node is able to accurately determine the channel on which the other node is operating at any given time, thus facilitating communications between the nodes. In some examples, the child node synchronizes its clock to the parent node and, in addition, the child node adopts the channel hopping sequence of the parent node. In this way, the child node is always on the same channel as the parent node, and thus neither of the two nodes needs to store timing information of the other node, nor does either node need to calculate the channel on which the other node is operating if a transmission is to be performed between the nodes. These and other examples are now described with reference to the drawings.

FIG. 1 is a block diagram of a wireless network 100 having sleepy and non-sleepy nodes, in accordance with various examples. In examples, the wireless network 100 is a half-duplex, unslotted, channel hopping network, but the scope of this disclosure also includes other types of wireless networks in which battery-powered nodes may enjoy enhanced battery life due to a lack of heartbeat packet transmissions. The example wireless network 100 includes nodes 102, 104, 106, 108, 110, and 112. Node 102 is a sleepy node, meaning that node 102 is battery-powered and repeatedly enters a sleep (e.g., low power consumption) state to preserve battery life, exiting the sleep state intermittently to communicate with node 104. In examples, node 102 communicates only with node 104, whereas node 104 may communicate with the remaining nodes in the wireless network 100. Accordingly, node 102 is referred to herein as a child node, and node 104 is referred to herein as a parent node. Parent node 104, which, as described, is configured to communicate with nodes 106, 108, 110, and 112, is not a battery-powered node (e.g., is coupled to mains power), and thus parent node 104 is not a sleepy node. Similarly, in examples, the nodes 106, 108, 110, and 112 are not battery-powered nodes, and thus these nodes also are not sleepy nodes. Because child node 102 is the only sleepy, battery-powered node in the wireless network 100, the power conservation techniques described herein are generally contemplated for implementation on child node 102 to improve battery life. However, these techniques may be implemented on any suitable node in the wireless network 100 to reduce power consumption in general and to reduce traffic on the wireless network 100.

In some examples, the wireless network 100 is part of a metering system, for example in a residential or commercial context. In some examples, child node 102 is a battery-powered meter of any suitable type and configured to measure usage of any suitable resource. Parent node 104 may be, for example, a water or gas meter, with child node 102 providing data (e.g., measurements) to parent node 104. Parent node 104, in turn, may provide measurements from child node 102 and from parent node 104 to the remaining non-sleepy nodes in wireless network 100, each of which may be a meter (e.g., electricity meters). One or more of the non-sleepy nodes in the wireless network 100 may communicate with a central hub (not shown), such as to provide data from some or all of the other nodes in the wireless network 100 to the central hub. The central hub may then process the data or provide it to another suitable entity for processing and use as may be appropriate.

Figure 2:
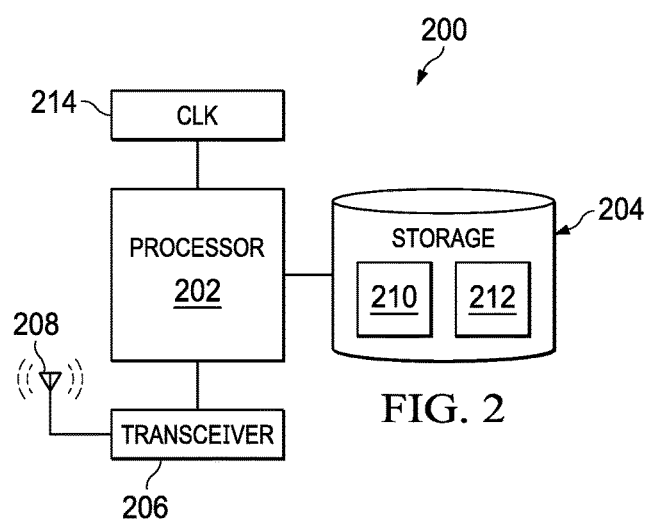
FIG. 2 is a block diagram of a wireless network node, in accordance with various examples.

FIG. 2 is a block diagram of a wireless network node 200, in accordance with various examples. Example node 200 is representative of each of the nodes in the wireless network 100 of FIG. 1. Node 200 includes a processor 202, storage 204 (e.g., random access memory (RAM)) coupled to the processor 202, a transceiver 206 coupled to the processor 202, and an antenna 208 coupled to the transceiver 206. All transmissions and receptions occur by way of the transceiver 206. The storage 204 may store executable code 210 and data structure 212. The executable code 210, when executed by the processor 202, causes the processor 202 to perform some or all of the actions attributed herein to the node 200, which, as described above, is representative of the various nodes shown in the wireless network 100 of FIG. 1. Data structure 212 stores information pertaining to the wireless network 100, such as timing or clock information associated with other nodes in the wireless network 100, hopping sequences used by the other nodes in the wireless network 100, and other information that may be useful to node 200 to engage in wireless communications with other nodes in the wireless network 100. Example data structures 212 are described below. The node 200 includes a clock 214 coupled to the processor 202. The clock 214 is an example of the clocks described herein, with elapsed times and clock synchronizations generally referring to the example clock 214.

Figure 3:
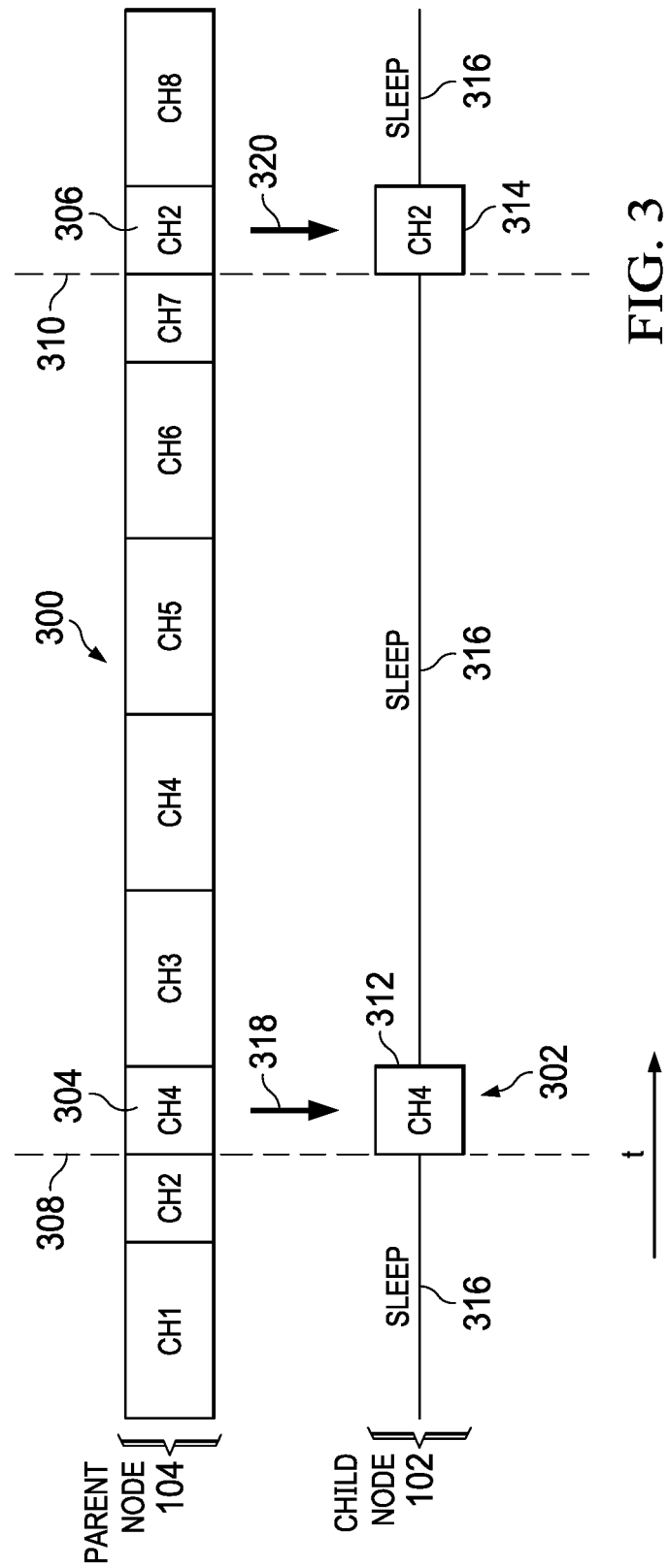
FIG. 3 is a timing diagram depicting clock synchronization between wireless network nodes, in accordance with various examples.

FIG. 3 is a timing diagram depicting clock synchronization between wireless network nodes, in accordance with various examples. More specifically, the timing diagram of FIG. 3 indicates a channel hopping scheme 300 for parent node 104 (FIG. 1) and a channel hopping scheme 302 for child node 102 (FIG. 1). A channel hopping scheme includes both sequence and timing elements, meaning that the scheme indicates both the channel hopping sequence in which a node hops as well as the timing with which the node hops through that channel hopping sequence. The timing diagram of FIG. 3 assumes the existence of eight channels, each with its own frequency band: CH1, CH2, CH3, CH4, CH5, CH6, CH7, and CH8. Parent node 104 has a default, iterative hopping sequence of CH1, CH2, CH3, CH4, CH5, CH6, CH7, and CH8, in that order. Child node 102 has a different channel hopping sequence, the only relevant channels for this discussion being CH4 and CH2, in that order.

A channel hopping sequence indicates the channels through which a node receives packets. Thus, for example, a channel hopping sequence of CH1, CH2, CH3, and CH4 means that the corresponding receiver node is able to receive packets on CH1 during the CH1 slot (e.g., during the CH1 dwell time), on CH2 during the CH2 slot, and so on. To transmit a packet to the receiver node, a transmitter node must identify and use the channel on which the receiver node is receiving at the time of transmission. Thus, a transmitter node's default channel hopping sequence may be interrupted to switch to a receiver node's current channel, and, after the transmitter node has finished sending its packet to the receiver node, the transmitter node may resume its default channel hopping sequence. For example, as shown by channel hopping scheme 300, parent node 104 continuously hops through a default channel hopping sequence of CH1, CH2, CH3, CH4, CH5, CH6, CH7, and CH8, but the parent node 104 interrupts this default sequence to enter CH4 as indicated by numeral 304 and to enter CH2 as indicated by numeral 306. Parent node 104 enters CH4 (numeral 304) at time 308, and parent node 104 enters CH2 (numeral 306) at time 310. Parent node 104 enters CH4 at time 308 because parent node 104 is to transmit a packet 318 to child node 102 at time 308, and at time 308, child node 102 is on CH4, as channel hopping scheme 302 shows at numeral 312. Similarly, parent node 104 enters CH2 at time 310 because parent node 104 is to transmit a packet 320 to child node 102 at time 310, and at time 310, child node 102 is on CH2, as numeral 314 indicates.

Because child node 102 is a sleepy node, each channel slot in the channel hopping scheme 302 of the child node 102 is separated by sleep periods 316 when child node 102 is in a power-conserving sleep state. Because parent node 104 is a non-sleepy node, parent node 104 continuously hops through its channel hopping sequence without entering sleep states.

In accordance with various examples described herein, child node 102 advantageously captures information provided by parent node 104 in packets 318, 320 and stores and uses this information to avoid sending heartbeat packets to parent node 104. Specifically, child node 102 uses the information in packets 318, 320 to synchronize its clock with the clock of parent node 104. Heartbeat packets are used to mitigate the deleterious effects of clock drift by synchronizing clocks, but because child node 102 synchronizes its clock to that of parent node 104 using packets received from parent node 104, there is no longer any need to transmit heartbeat packets from child node 102 to parent node 104. Eliminating the transmission of heartbeat packets by child node 102 significantly reduces power consumption and preserves battery life in child node 102. The manner in which child node 102 captures and uses information in packets 318, 320 to synchronize its clock to the clock of parent node 104 to mitigate clock drift is now described with simultaneous reference to FIGS. 1, 2, 3, 4A, and 4B.

Figures 4A, 4B:
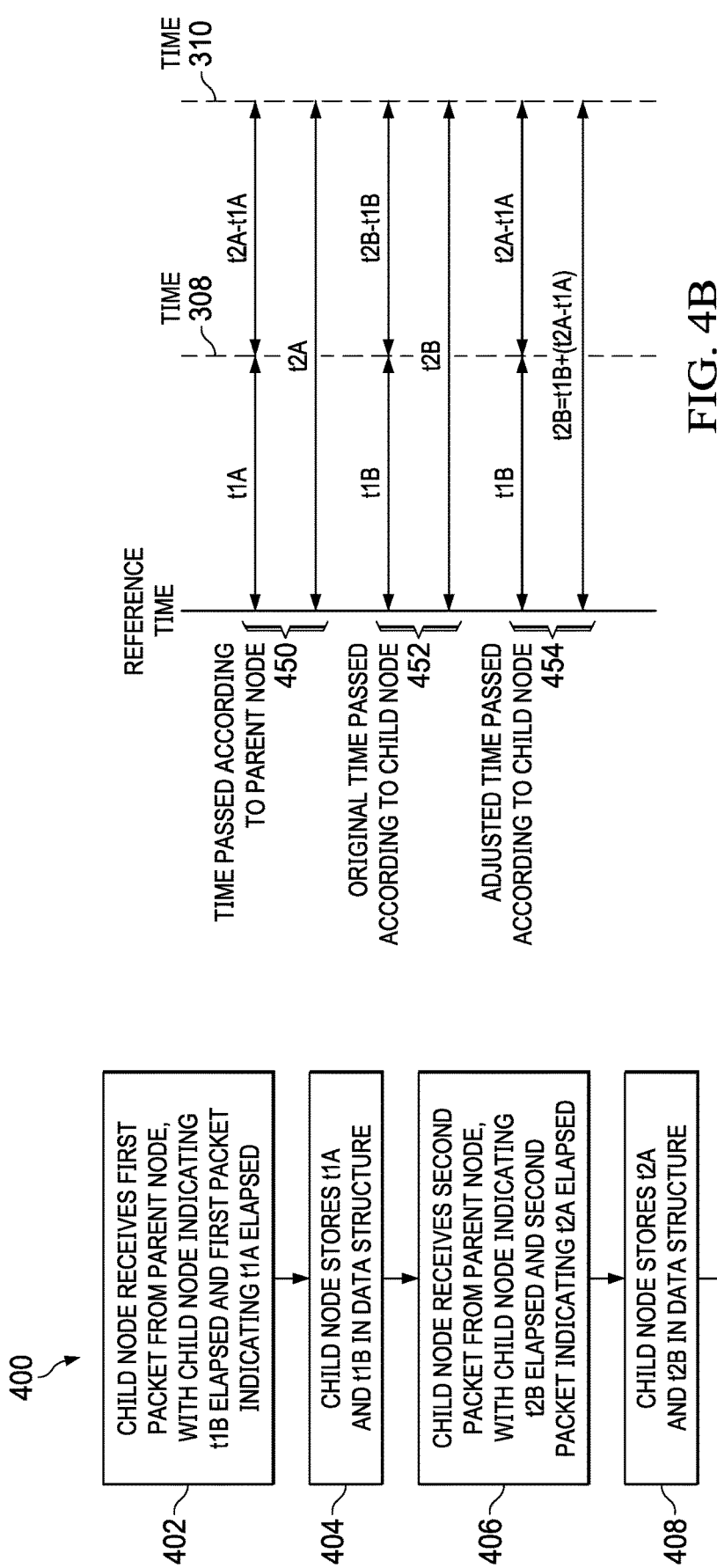
FIG. 4A is a flow diagram of a method for synchronizing clocks between wireless network nodes, in accordance with various examples.
FIG. 4B is a timing diagram for synchronizing clocks between wireless network nodes, in accordance with various examples.

FIG. 4A is a flow diagram of a method 400 for synchronizing clocks between wireless network nodes, in accordance with various examples. The method 400 begins with child node 102 receiving the example packet 318 from parent node 104 (402). Child node 102 receives packet 318 at time 308. At time 308, the clock of child node 102 (e.g., clock 214 in FIG. 2) indicates that a time t1B has elapsed since a prior point in time at which the child and parent nodes 102, 104 were clock-synchronous. This time may be referred to herein as a reference time. At time 308, the packet 318 indicates that the clock of parent node 104 (e.g., clock 214 in FIG. 2) indicates that a time t1A has elapsed since the reference time. The method 400 includes child node 102 storing the times t1A and t1B in a data structure (404), such as data structure 212 (FIG. 2). The method 400 includes child node 102 receiving the packet 320 from parent node 104 (406). Child node 102 receives packet 320 at time 310. At time 310, the clock of child node 102 indicates that a time t2B has elapsed since the reference time, and the packet 320 indicates that the clock of parent node 104 indicates that a time t2A has elapsed since the reference time. The method 400 includes child node 102 storing t2A and t2B in the data structure (408). Values t1A, t2A, t1B, t2B, and similar indications of elapsed time may be referred to herein as elapsed time indications.

Child node 102 receives packet 320 (at time 310) after receiving packet 318 (at time 308). Because of clock drift, the clocks of child node 102 and parent node 104 may register the time interval between times 308 and 310 differently. The clock of child node 102 at time 308 was t1B and at time 310 was t2B. Thus, child node 102 has registered the time interval between times 308 and 310 to be t2B−t1B. In contrast, the clock of parent node 104 at time 308 was t1A and at time 310 was t2A. Thus, parent node 104 has registered the time interval between times 308 and 310 to be t2A−t1A. Because of clock drift, the quantity t2B−t1B will be different than t2A−t1A. Because the child and parent nodes 102, 104 register time differently, and because clock drift is only exacerbated as time progresses, child node 102 should synchronize its clock to the clock of parent node 104. However, in lieu of using heartbeat packets to achieve this clock synchronicity, child node 102 adjusts its clock so the time difference between times 308, 310 according to child node 102 is the same as that of parent node 104. Specifically, child node 102 sets its clock at t2B, which indicates the current elapsed time from the reference time, to be equivalent to the sum of t1B (which is the value of child node 102's clock at time 308) and (t2A−t1A), which is the passage of time between times 308, 310 as registered by parent node 104 (410):

$$t2B = t1B + (t2A - t1A) \quad (1)$$

The value of t1B is assumed to have been synchronized to the clock of parent node 104 using the method 400. If t1B is not synchronized to the clock of parent node 104, then the result of the calculation at step 410 will include any clock drift inherent in the value of t1B. The method 400 includes child node 102 transmitting a packet to parent node 104 using the corrected value of t2B.

FIG. 4B is a timing diagram for synchronizing clocks between wireless network nodes, in accordance with various examples. FIG. 4B depicts the timing aspects of the above description in a visual format to facilitate understanding. FIG. 4B depicts the passage of time according to parent node 104 (numeral 450), the original passage of time according to child node 102 (numeral 452), and the passage of time according to child node 102 as adjusted according to method 400 (numeral 454). These times are depicted in the context of the reference time described above, time 308, and time 310 (FIG. 3). As shown, parent node 104 registers the time interval from the reference time to time 308 to be t1A. Parent node 104 registers the time interval from the reference time to time 310 to be t2A. Thus, parent node 104 registers the time interval from time 308 to time 310 to be t2A−t1A. Similarly, prior to adjustment as described in method 400, child node 102 registers the time interval from the reference time to time 308 to be t1B. Child node 102 registers the time interval from the reference time to time 310 to be t2B. Thus, child node 102 registers the time interval from time 308 to time 310 to be t2B−t1B. However, t2B−t1B differs from t2A−t1A due to clock drift. To synchronize child node 102's clock and, thus, time elapsed with that of parent node 104, child node 102 equates its time elapsed between time 308 and 310 to be t2A−t1A. Child node 102 adds the result of this calculation to t1B, which is already assumed to be equivalent to t1A due to a prior application of the method 400. Thus, child node 102's clock, which indicates the time elapsed from the reference time to time 310, to be t1B+(t2A−t1A).

Figure 5:
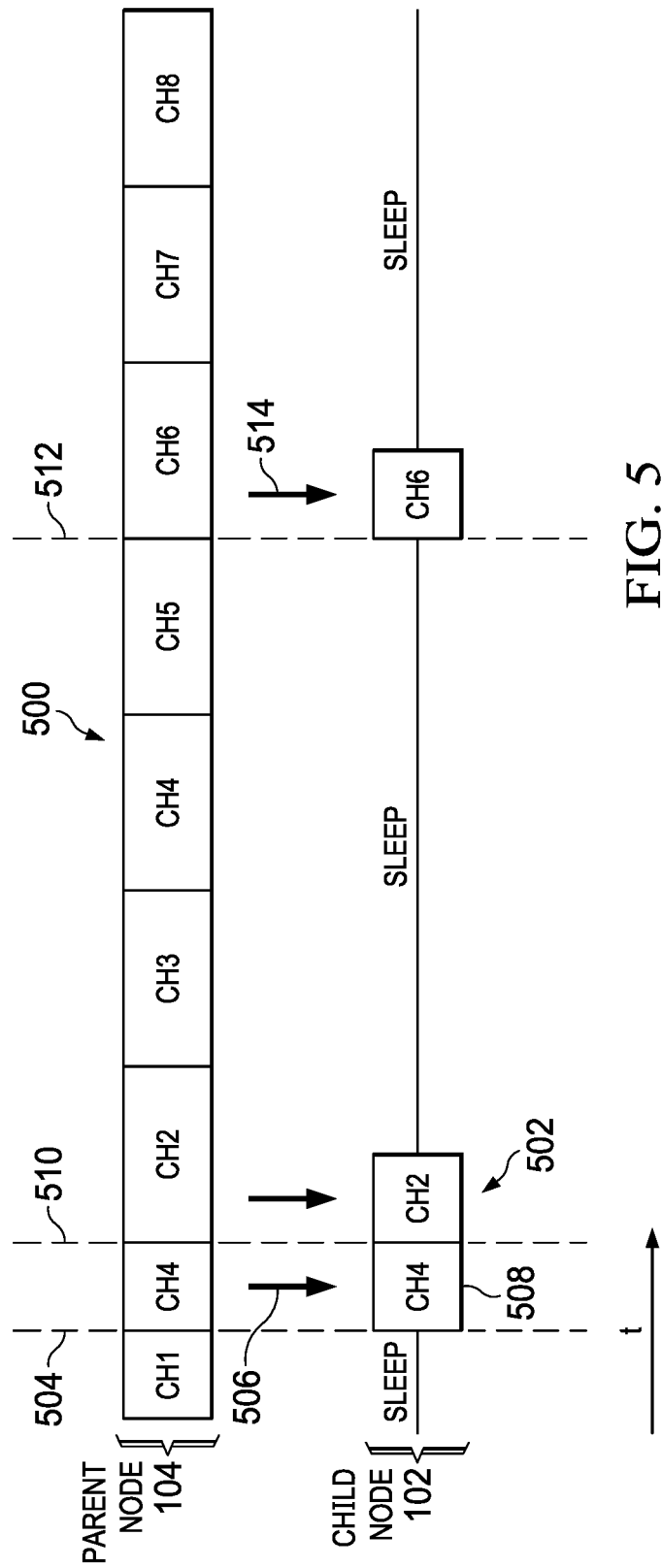
FIG. 5 is a timing diagram depicting clock and channel hopping synchronization between wireless network nodes, in accordance with various examples.

FIG. 5 is a timing diagram depicting clock and channel hopping synchronization between wireless network nodes, in accordance with various examples. The timing diagram of FIG. 5 includes a channel hopping scheme 500 for parent node 104 and a channel hopping scheme 502 for child node 102. The channel hopping scheme 500 is similar to the channel hopping scheme 300 of FIG. 3, with the default channel hopping sequence being CH1, CH2, CH3, CH4, CH5, CH6, CH7, and CH8, with the default sequence being broken at time 504 for a hop to CH4 to enable parent node 104 to transmit a packet 506 to child node 102, as shown. The channel hopping scheme 502 for child node 102 differs from the channel hopping scheme 302 in FIG. 3 in that the packet 506 includes the channel hopping sequence of parent node 104 and the child node 102, upon receiving the packet 506, captures, stores, and begins to follow the channel hopping sequence of parent node 104. For example, after channel slot 508 on CH4, at time 510, the channel hopping sequence of child node 102 is identical to the channel hopping sequence of parent node 104 whenever child node 102 is not in a sleep state. In addition, the child node 102 synchronizes its clock to the clock of parent node 104 as described above with respect to method 400. In this way, the child and parent nodes 102, 104 remain clock-synchronized with each other. In addition, child node 102 is consistently on the same channel as parent node 104 whenever child node 102 is awake (e.g., not in a sleep state). For example, at time 512, both parent and child nodes 104, 102 are on CH6. As a result, parent node 104 no longer needs to store timing and channel hopping sequence information about child node 102, because parent node 104 can transmit on whatever channel parent node 104 is currently using, and child node 102 will receive it because child node 102 will be on the same channel as parent node 104. This technique may be implemented on child node 102 so long as child node 102 communicates only with parent node 104.

Figure 6:
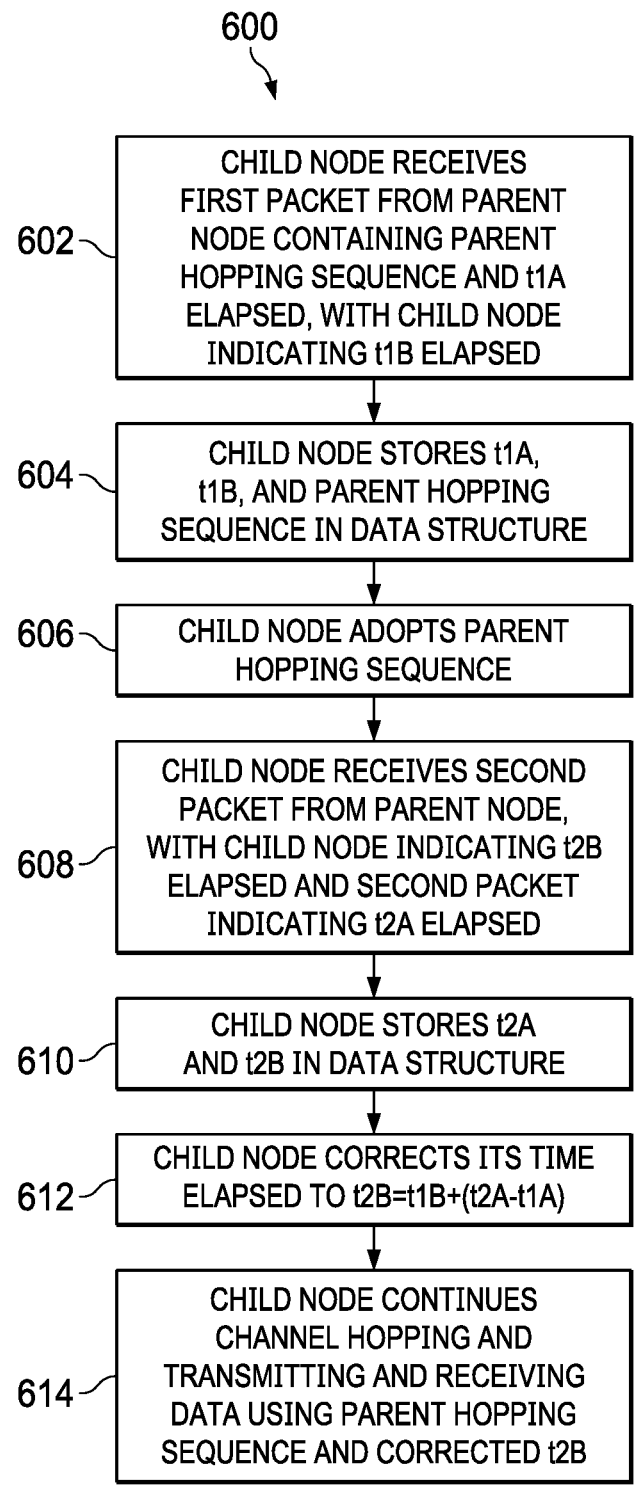
FIG. 6 is a flow diagram of a method for synchronizing clocks and channel hopping schemes between wireless network nodes, in accordance with various examples.

FIG. 6 is a flow diagram of a method 600 for synchronizing clocks and channel hopping schemes between wireless network nodes, in accordance with various examples. The method 600 is described with reference to FIG. 5. The method 600 begins with the child node 102 receiving the packet 506 from parent node 104 (602). The packet 506 includes the channel hopping sequence of parent node 104. The packet 506 also indicates that, from the perspective of parent node 104, t1A has elapsed since a reference time. Upon receipt of the packet 506, child node 102 registers that t1B has elapsed. The method 600 also includes child node 102 storing t1A, t1B, and the channel hopping sequence of parent node 104 in a data structure (e.g., data structure 212 in FIG. 2) (604). The method 600 includes child node 102 adopting the channel hopping sequence of parent node 104 (606) as described above. The method 600 includes child node 102 receiving a packet 514 (FIG. 5) from parent node 104 at time 512 (608). The packet 514 indicates that from the perspective of parent node 104, at time 512, t2A has elapsed since the reference time, and according to the perspective of child node 102, t2B has elapsed since the reference time. The method 600 includes child node 102 storing t2A and t2B in the data structure (610). The method 600 includes child node 102 correcting its time elapsed to expression (1) provided above (612). The method 600 includes child node 102 continuing to channel hop and to transmit and receive data using the parent hopping sequence and synchronized clock (614).

Figures 7, 8:
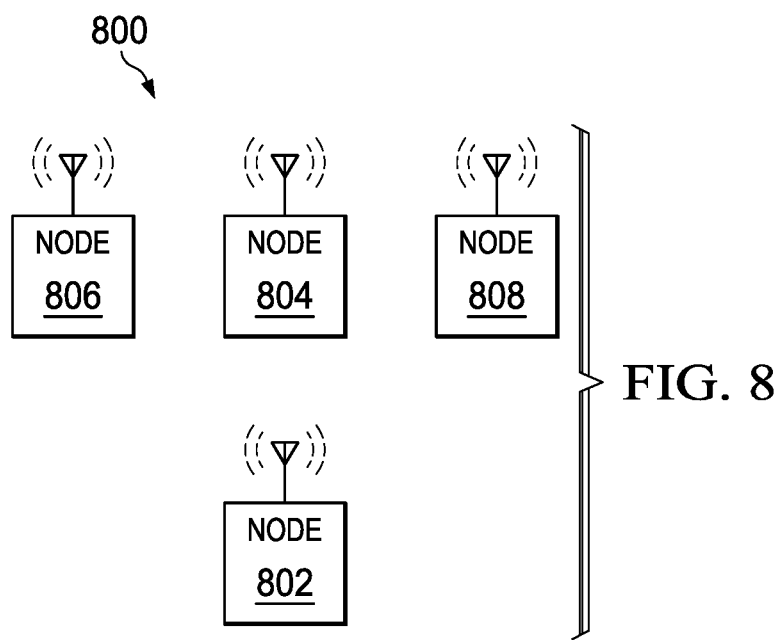
FIG. 7 is a diagram of a wireless network node data structure for storing synchronization information, in accordance with various examples.
FIG. 8 is a block diagram of a wireless network having multiple nodes, in accordance with various examples.

FIG. 7 is a diagram of a wireless network node data structure 700 for storing synchronization information, in accordance with various examples. The data structure 700 is an example of the data structure 212 (FIG. 2) and the data structures described above. The example data structure 700 includes columns 702, 704, 706 and 708. Column 702 indicates different node IDs, as the data structure 700 may store information associated with multiple nodes. Column 704 indicates time elapsed from a reference time from the perspective of the node identified in column 702. Column 706 indicates the channel hopping sequence of the node identified in column 702. Column 708 indicates miscellaneous information that may be pertinent to the node identified in column 702. The data structure 700 includes multiple rows, such as rows 710 and 712, with each row including information pertaining to a different node in a wireless network.

FIG. 8 is a block diagram of a wireless network 800 having multiple nodes, in accordance with various examples. In some examples, the wireless network 800 includes nodes 802, 804, 806, and 808. In some examples, node 802 is a sleepy node and the remaining nodes are non-sleepy nodes, although the scope of this disclosure is not limited as such. For instance, in some examples, the nodes 802, 804, 806, and 808 are non-sleepy nodes. Node 804 (e.g., a non-sleepy parent node) may receive clock information, channel hopping scheme information, and any other suitable information from node 802 (e.g., a sleepy child node). The node 804 may share the clock information, channel hopping scheme information, and any other suitable information associated with node 802 with other nodes in the wireless network 800. For example, node 804 may share such information with one or more of nodes 806, 808 by way of broadcasts, unicasts, or a combination thereof. If a node in the wireless network 800 in addition to node 804 has such information pertaining to node 802, node 802 may communicate with that node in the event node 804 becomes too busy or in otherwise unavailable. Node 804 may include such information in a header and/or payload of a packet transmitted to another non-sleepy node in the wireless network 800. The timing information may include a time at node 804 at which node 804 transmits the packet, the time at node 802 (or, in some examples, in a non-sleepy node of the wireless network 800), and the time at node 804 when it determined the time at node 802. The non-sleepy node receiving the packet from node 804 may record in a data structure the time of node 804 and may calculate and record the time of node 802. In particular, the time of node 802 may be calculated as the difference between the time of node 804 (as stored in the packet) and the time at node 804 when it determined the time at node 802 (as stored in the packet), added to the time of node 802 (as stored in the packet). In this way, another non-sleepy node besides node 804 now may communicate accurately with node 802 in the event node 804 is no longer able or available to communicate with node 802.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means+/−10 percent of the stated value. Modifications are possible in the described examples, and other examples are possible within the scope of the claims.

What is claimed is:

1. An electronic device, comprising:
   a transceiver; and
   a processor coupled to the transceiver and configured to:
   receive elapsed time indications in multiple packets from another electronic device via the transceiver, wherein the elapsed time indications include:
   a first time elapsed since a reference time, the first time included in a first packet of the multiple packets, and a second time elapsed since the reference time, the second time included in a second packet of the multiple packets;

determine a difference between the first and second times;

synchronize a clock of the electronic device based on the difference; and transmit a packet via the transceiver using the synchronized clock of the electronic device, wherein the processor is configured to add the difference to a third time elapsed since the reference time, the third time measured by the electronic device.

2. The electronic device of claim 1, wherein the processor is configured to enter and exit a sleep state between receipt of the first packet and receipt of the second packet.

3. The electronic device of claim 1, wherein the processor is configured to not transmit heartbeat packets to the another electronic device.

4. The electronic device of claim 1, wherein the electronic device is configured to communicate with only the another electronic device.

5. The electronic device of claim 1, wherein the processor is configured to store, in the electronic device, a node identification of the another electronic device, a hopping sequence of the another electronic device, and the elapsed time indications.

6. The electronic device of claim 5, wherein the processor is configured to store, in the electronic device, a further node identification of a further device, a hopping sequence of the further device, and elapsed time indications associated with the further device.

7. The electronic device of claim 6, wherein the processor is configured to receive the hopping sequence of the further device and the elapsed time indications associated with the further device in a further packet from the further device.

8. An electronic device, comprising:
a transceiver; and
a processor coupled to the transceiver, the processor configured to:
receive a first packet from another electronic device via the transceiver, the first packet indicating that a first time has elapsed since a reference time and the processor indicating that a second time has elapsed since the reference time;
subsequent to receipt of the first packet, receive a second packet from the another electronic device via the transceiver, the second packet indicating that a third time has elapsed since the reference time;
synchronize a clock of the electronic device to a clock of the another electronic device using the first, second, and third times; and
transmit a packet to the another electronic device via the transceiver and using the synchronized clock of the electronic device.

9. The electronic device of claim 8, wherein the processor is configured to enter and exit a sleep state after receipt of the first packet and prior to the receipt of the second packet.

10. The electronic device of claim 8, wherein, to synchronize the clock of the electronic device to the clock of the another electronic device, the processor is configured to determine a difference between the third time and the first time.

11. The electronic device of claim 10, wherein, to synchronize the clock of the electronic device to the clock of the another electronic device, the processor is configured to sum the difference and the second time.

12. The electronic device of claim 11, wherein, to synchronize the clock of the electronic device to the clock of the another electronic device, the processor is configured to set the sum as a current elapsed time since the reference time.

13. The electronic device of claim 8, wherein the electronic device is configured to communicate only with the another electronic device.

14. The electronic device of claim 8, wherein the processor is configured to transmit the packet while hopping across frequency band channels according to a channel hopping scheme of the another electronic device.

15. The electronic device of claim 14, wherein the first packet comprises the channel hopping scheme of the another electronic device.

16. The electronic device of claim 8, wherein the processor is configured to not transmit heartbeat packets to the another electronic device.

17. The electronic device of claim 8, wherein the processor is configured to store, in the electronic device, a node identification of the another electronic device, a hopping sequence of the another electronic device, elapsed time indications, a further node identification of a further device, a hopping sequence of the further device, and elapsed time indications associated with the further device.

18. A system, comprising:
an electronic device, comprising:
a transceiver; and
a processor coupled to the transceiver and configured to:
receive elapsed time indications in multiple packets from another electronic device via the transceiver, wherein the elapsed time indications include:
a first time elapsed since a reference time, the first time included in a first packet of the multiple packets, and
a second time elapsed since the reference time, the second time included in a second packet of the multiple packets;
determine a difference between the first and second times;
synchronize a clock of the electronic device based on the difference; and
transmit a packet via the transceiver to the another electronic device using the synchronized clock of the electronic device and while hopping across frequency band channels according to a channel hopping scheme of the another electronic device, wherein the processor is configured to add the difference to a third time elapsed since the reference time, the third time measured by the electronic device.

19. The system of claim 18, wherein the processor is configured to enter and exit a sleep state after receipt of the first packet of the multiple packets and prior to receipt of the second packet.

20. The system of claim 18, wherein the electronic device is configured to communicate with only the another electronic device.

21. The system of claim 18, further comprising the another electronic device, wherein the another electronic device is configured to provide timing information and channel hopping scheme information of the electronic device to a third electronic device, and wherein the third electronic device and the electronic device are configured to communicate with each other.

22. The system of claim 18, wherein the first packet comprises the channel hopping scheme of the another electronic device.

\* \* \* \* \*